US007372860B1

(12) United States Patent
Haumont

(10) Patent No.: US 7,372,860 B1
(45) Date of Patent: May 13, 2008

(54) COMMUNICATION SYSTEM AND METHOD

(75) Inventor: Serge Haumont, Helsinki (FI)

(73) Assignee: Nokia Corporation, Espoo (FI)

( * ) Notice: Subject to any disclaimer, the term of this patent is extended or adjusted under 35 U.S.C. 154(b) by 811 days.

(21) Appl. No.: 10/312,814

(22) PCT Filed: Jul. 3, 2000

(86) PCT No.: PCT/EP00/06200

§ 371 (c)(1),
(2), (4) Date: Apr. 2, 2003

(87) PCT Pub. No.: WO02/03724

PCT Pub. Date: Jan. 10, 2002

(51) Int. Cl.
*H04L 12/56* (2006.01)
(52) U.S. Cl. ...................... 370/401; 370/466
(58) Field of Classification Search .............. 370/401,
370/395.52, 389, 466, 467, 485, 490, 496,
370/328–338, 352; 379/92.04, 121.06, 130,
379/140, 204.01; 455/433, 435.1, 435.2,
455/435.3, 422.1, 440, 423, 424, 435, 67.11,
455/466
See application file for complete search history.

(56) References Cited

U.S. PATENT DOCUMENTS

| 5,793,762 | A | | 8/1998 | Penners et al. | |
|---|---|---|---|---|---|
| 6,073,017 | A | | 6/2000 | Xu et al. | |
| 6,104,929 | A | * | 8/2000 | Josse et al. | 455/445 |
| 6,160,804 | A | * | 12/2000 | Ahmed et al. | 370/349 |
| 6,304,913 | B1 | * | 10/2001 | Rune | 709/241 |
| 6,415,151 | B1 | * | 7/2002 | Kreppel | 455/445 |
| 6,614,774 | B1 | * | 9/2003 | Wang | 370/338 |
| 6,654,589 | B1 | * | 11/2003 | Haumont | 455/67.11 |
| 6,731,932 | B1 | * | 5/2004 | Rune et al. | 455/432.1 |
| 6,760,325 | B1 | * | 7/2004 | Hameleers et al. | 370/352 |
| 6,898,433 | B1 | * | 5/2005 | Rajaniemi et al. | 455/456.1 |

(Continued)

FOREIGN PATENT DOCUMENTS

EP 0 971 553 A2 7/1999

(Continued)

OTHER PUBLICATIONS

C. Perkins et al., IMHP: A Mobile Host Protocol For The Internet, Computer Networks and ISDN Systems 27 (1994) 479-491.

(Continued)

*Primary Examiner*—Ricky Q. Ngo
*Assistant Examiner*—Gary Mui
(74) *Attorney, Agent, or Firm*—Squire, Sanders & Dempsey, L.L.P.

(57) ABSTRACT

The described invention relates to a communication method and system having at least one communication network to which a plurality of subscribers are attachable and which comprises at least one subscriber information register storing subscriber information including location information related to the subscribers, at least one gateway support node for handling connections to and/or from other networks, and at least one serving node for handling connections with connection originating or terminating elements. At least one network element is provided in addition to the gateway support node which stores information regarding the addresses of serving nodes presently or recently in charge of handling connections to and/or from connection originating or terminating elements. The gateway support node can therefore address this network element for connection, and requires reduced own storage capacity.

30 Claims, 3 Drawing Sheets

U.S. PATENT DOCUMENTS 7,027,800 B2 * 4/2006 Haumont et al. ............. 705/14
7,027,825 B2 * 4/2006 Mizell et al. ............... 455/466

FOREIGN PATENT DOCUMENTS

| WO | WO 97/21313 | 6/1997 |
| WO | WO 00/05845 | 2/2000 |
| WO | WO 00/21319 | 4/2000 |
| WO | WO 00/28713 | 5/2000 |

OTHER PUBLICATIONS

G. Brasche et al., Concepts, Services, and Protocols of the New GSM Phase 2+ General Packet Radio Service, IEEE Communications Magazine, Aug. 1997, pp. 94-104.

* cited by examiner

COMMUNICATION SYSTEM AND METHOD

BACKGROUND OF THE INVENTION

1. Field of the Invention

The present invention relates to a communication method and system having at least one communication network to which a plurality of subscribers are attachable.

2. Description of the Prior Art

Communication systems for mobile communication such as GSM (Global System for Mobile Telecommunications), GPRS (General Packet Radio Service), or UMTS (Universal Mobile Telecommunications System) networks usually comprise one or more home location registers (HLRs) for permanent storage of subscriber information such as IMSI (International Mobile Subscriber Identity), one or more VLRs (Visitor Location Registers) providing access to the subscriber equipment, one or more MSCs (Mobile Switching Centers) for transmitting data to the user equipments, and the like. When a connection is to be connected to a subscriber e.g. from an external network, the home location register will normally be accessed for receiving information necessary for properly routing of the connection.

One of several possible procedures to be performed between a user equipment such as a mobile station (MS) and the network for connecting an external network is a so-called "PDP context activation", wherein PDP stands for packet data protocol. Such a PDP context activation may be performed in particular in a packet switched network such as a GPRS network wherein several information elements such as requested or negotiated QoS (Quality of Service) and/or PDP address are transmitted between the user equipment (MS) and a support node handling the communication with the user equipment. Such a "PDP context activation" procedure is a standardized process and is e.g. described in the publication ETSI (European Telecommunications Standards Institute) EN 301 344 V6.3.2 (1999-07), pages 59 ff. This process is therefore not be explained here in further detail. (For more detailed information, it is referred to the above mentioned document.) The "PDP context activation" procedure may be initiated by a mobile station intending to attach to the network after switch-on, for instance, or may be requested by the network and is then called "network-requested PDP context activation" (NRCA) procedure. See for instance EN 301 344, section 9.2.2.2.

Such a network-requested PDP context activation procedure allows for example a GGSN (Gateway GPRS support node) to initiate the activation of a PDP context. When receiving a PDP (Packet Data Protocol) PDU (Protocol Data Unit), the GGSN may check if a PDP context has already been established for that PDP address. If no PDP context has previously been established, the GGSN may try to deliver the PDP PDU by initiating a network-requested PDP context activation procedure. The GGSN may send a message (containing e.g. IMSI, International Mobile Subscriber Identification) to the home location register HLR requesting routing information for GPRS. When the HLR determines that the request can be served, it returns a message to the GGSN indicating routing information.

When the HLR determines that the request cannot be served (e.g. the IMSI is unknown in HLR), the HLR will send back a negative response indicating the reason for non-service.

Furthermore, the gateway node may store an information "Mobile Station Not Reachable for GPRS" (MNRG flag) indicating whether or not a user equipment such as a mobile station can be reached.

In addition, the gateway node is usually stores the address of the support node with which the gateway established the last connection for transmitting data to and/or from a user equipment (e.g. last PDP context). The GGSN also should store the mapping between PDP address (ie IP address) and IMSI. The gateway hence requires a large storage capacity for storing the information which will be retained even for presently not active user equipments.

SUMMARY OF THE INVENTION

The present invention provides a solution to the problem of the prior art which does not require unduly large storage capacity of the gateway support node(s).

The invention provides a system having at least one communication network to which a plurality of subscribers are attachable and which comprises at least one subscriber information register such as a HLR storing subscriber information including location information related to the subscribers, at least one gateway support node for handling connections to and/or from other networks, and at least one serving node for handling connections to User Equipment. The system comprises at least one network element, in addition to, and normally different from the gateway support node, which preferably is provided for accessing the subscriber information register when information on one or more subscribers is necessary for handling connections directed to these subscribers. The at least one network element comprises a memory storing information containing a context for every user equipment. This context contains:

an address of a serving node presently or recently in charge of handling connections toward user equipment, and/or information on the user equipment reachability, and/or a logical name or a subscriber identity to network address mapping, or network address to logical name or subscriber identity mapping.

The system may comprise at least one subscriber information register such as a home location register (HLR) storing information related to the subscribers. The subscriber information register can be accessed when information on one or more subscribers is needed for handling connections and the like.

The subscriber identity may e.g. be the identity used within the network such as IMSI, MSISDN etc. which subscriber identity is different from the address used by another network such as an external network connected to a gateway node of the present network. This address may e.g. be a address for connection routing such as a PDP address of the user equipment.

The context may e.g. contain the mapping of the address used in the external network (e.g. PDP address in GSM and/or UMTS systems) and an identifier of the user equipment (e.g. IMSI in GSM and/or UMTS systems), and/or the addresses of support nodes presently or recently in charge of handling connection to the user equipment. The general term user equipment used in this application, refers to a Mobile Station in GSM and/or UMTS systems.

The at least one network element preferably additionally stores information about presently unreachable user equipment (this information being for example the MNRG flag in GSM and/or UMTS systems).

For clarity, this new network element is called NRCA support node herein. The new network element however may be implemented into a variety of ways such as a server dedicated for this task, or a function integrated in another network element like a signaling Gateway (e.g. gateway converting signaling between IP network and PSTN network) or an Interworking support node which is implemented as an independent support node, or as part of a Serving support node.

In a preferred embodiment, the NRCA support node is able to generate interrogation access requests for accessing the subscriber information register.

The network preferably comprises at least one server for storing unique subscriber identifier information (IMSI).

According to one embodiment of the invention, the gateway support node(s) and the network element(s) generate and/or receive messages containing an IP address instead of an IMSI (International Mobile Subscriber Information) of a subscriber. The network element(s) is capable of deriving the IMSI from the PDP address (i.e. IP address).

Alternatively, or additionally, the gateway support node(s) and the network element(s) may generate and/or receive messages containing a logical name of a user instead of an IMSI (International Mobile Subscriber Information) thereof, one network element containing the correspondence between the logical name and the IMSI information.

The invention furthermore provides a method for or in a system as described above, wherein the at least one network element stores information regarding the addresses of serving nodes presently or recently in charge of handling a connection to user equipment.

The interrogation access requests may e.g. be caused by network-requested PDP Context Activation requests (NRCA).

The invention is particularly relevant for an UMTS or GPRS network implementing NRCA procedures but is also applicable to other types of networks such as GSM having registers which are to be accessed when initiating or performing connections.

According to the invention, at least some of the connection parameters previously stored in a gateway support node are now stored outside thereof, e.g. in an NRCA support node. These parameters preferably include the MNRG flag, and/or the old support node address such as old SGSN address to which a previous connection to an again selected user equipment was directed, IMSI of the user equipment to which NRCA procedure may be performed, and optionally run timers. In this case, the subscriber information register such as HLR (home location register) preferably stores the address of the NRCA support node instead of the address of the gateway support node (e.g. GGSN, i.e. gateway GPRS support node). This is needed so that when HLR indicates when an MS is reachable again and the HLR can inform the elements containing MNRG flag (here NRCA support node) to turn off the flag. But HLR does not need to be modified for that purpose. The HLR stores NRCA support node address in the field reserved for GGSN address.

When receiving an incoming packet for a given PDP address, the gateway support node sends a message (e.g. GTP message "GTP send routing info for GPRS") to the NRCA support node.

If the gateway support node maintains, in its memory or an external memory such as in a LDAP server, a mapping between IMSIs and IP addresses, the IMSI is included in the message. Then the message which is sent may be a GTP message (a so called "GTP send routing info for GPRS") according to GPRS/UMTS standards.

In an alternative embodiment, the standard GTP message sent from the gateway support node to the NRCA support node may be replaced by a modified GTP message containing the user IP address instead of IMSI. This is of particular advantage in networks using and transmitting the IP addresses instead of IMSI. The NRCA support node then preferably maintains, in its memory or an external memory such as in a LDAP server, a mapping between IMSIs and IP addresses. This alternative embodiment provides the benefit of avoiding the necessity of storing IMSI in the gateway support node. Further, a reduction of the signalling and delay caused by the routing of the connection results.

Both embodiments described above provide possible storage of the mapping between the IMSI and the PDP address in the memory of a different network entity such as in an LDAP server (LDAP, lightweight directory access protocol). Since this mapping changes rarely, a LDAP server is well suited for this task, as it may be queried regularly, but is updated quite rarely.

The gateway support node is preferably equipped with a timer which is started when an incoming packet is received, and determines how long this incoming packet (and possibly following ones) is stored before being deleted. This timer is stopped when an activate PDP context request is received. After the PDP context activation procedure stored packet can be forwarded to the user equipment. This timer should be long enough to allow the NRCA procedure to be completed. The gateway support node is programmed or structured so as not to generate any new "GTP send routing info for GPRS" message as long as the timer is running. When the timer expires, all packets received for this PDP (packet data protocol) address are deleted, and new "GTP send routing info for GPRS" messages can again be generated.

When the NRCA support node receives a message such as "GTP send routing info for GPRS" request from the gateway support node, the node first finds the old SGSN address by either interrogating HLR (HLR can always be found based on IMSI), or by checking whether the node has stored an old SGSN address for the user equipment (identified for instance by its IMSI). If such an old SGSN address is found, and if there is no indication that the MS is not reachable, the NRCA support node sends a PDU (protocol data unit) notification request to this SGSN. The SGSN 3 sends a "request PDP context activation" message to the mobile station MS 2. The PDP context activation is performed towards the gateway support node 4 (as it is the only one handling this IP address). The GGSN can then forward packet to the user equipment.

The invention may be implemented with any other protocol than GTP, as long as similar information is carried.

In a preferred implementation, the NRCA support node function is integrated in an Interworking GSN (GPRS support node), meaning that the MNRG flag and the "old SGSN address" may preferably be stored in an Interworking GSN (GPRS support node) which usually is provided for converting a GTP (GPRS tunneling protocol) message into a MAP (mobile application part) message for HLR interrogation. This structure and functioning of an Interworking GSN is known and standardized. See for example, ETSI EN 301 344 V6.3.2, section 5.6.2.7.2. This support node is provided with a memory for storing these parameters.

In a further preferred embodiment, the IP address may also be replaced by a user logical name which is then indicated in a message addressed to the gateway support node, and is used for transmitting the packets to the user identified by this logical name. In this embodiment, suitable in particular if every user of NRCA is not having a static IP address, a modified DNS server sends a message containing logical name and/or subscriber identity (IMSI) (e.g. a modified "GTP send routing info for GPRS") to the GGSN or NRCA support node informing that the DNS server has received a request from an external entity to derive the IP address based on the logical name.

In this alternative embodiment, the gateway support node, if having received the message from the DNS sends, in step 2.) of FIG. 2 to be described below, a modified "GTP send routing info for GPRS" message to the NRCA support node 5 in which the user logical name are indicated instead of IMSI.

When receiving such message (from modified DNS, or GGSN), the NRCA support node then preferably maintains, in its memory or an external memory such as in a LDAP server, a mapping between IMSIs and logical names. Once that the context is activated, the GGSN updates the DNS server with the IP address allocated for this particular logical name. The DNS can then provide this information to the requesting entity trying to reach the user. According to the present invention, there is no need to store a context for active or even for non-active addresses in the gateway support node. This simplifies the implementation of the gateway support node(s). Furthermore, a reduction of the necessary buffer capacity in the gateway support node(s), or alternatively allows the storage of more PDP contexts (for active addresses) occurs.

A further advantage resides in the possibility of separately handling the complex requirements of the NRCA feature.

In addition, the GTP to MAP conversion may be implemented in an Interworking support node so that there is no need to implement such a conversion feature in the serving support nodes such as SGSNs. Hence, the SGSNs can be implemented having a simpler structure.

DETAILED DESCRIPTION OF PREFERRED EMBODIMENTS OF THE PRESENT INVENTION

Figure 1:
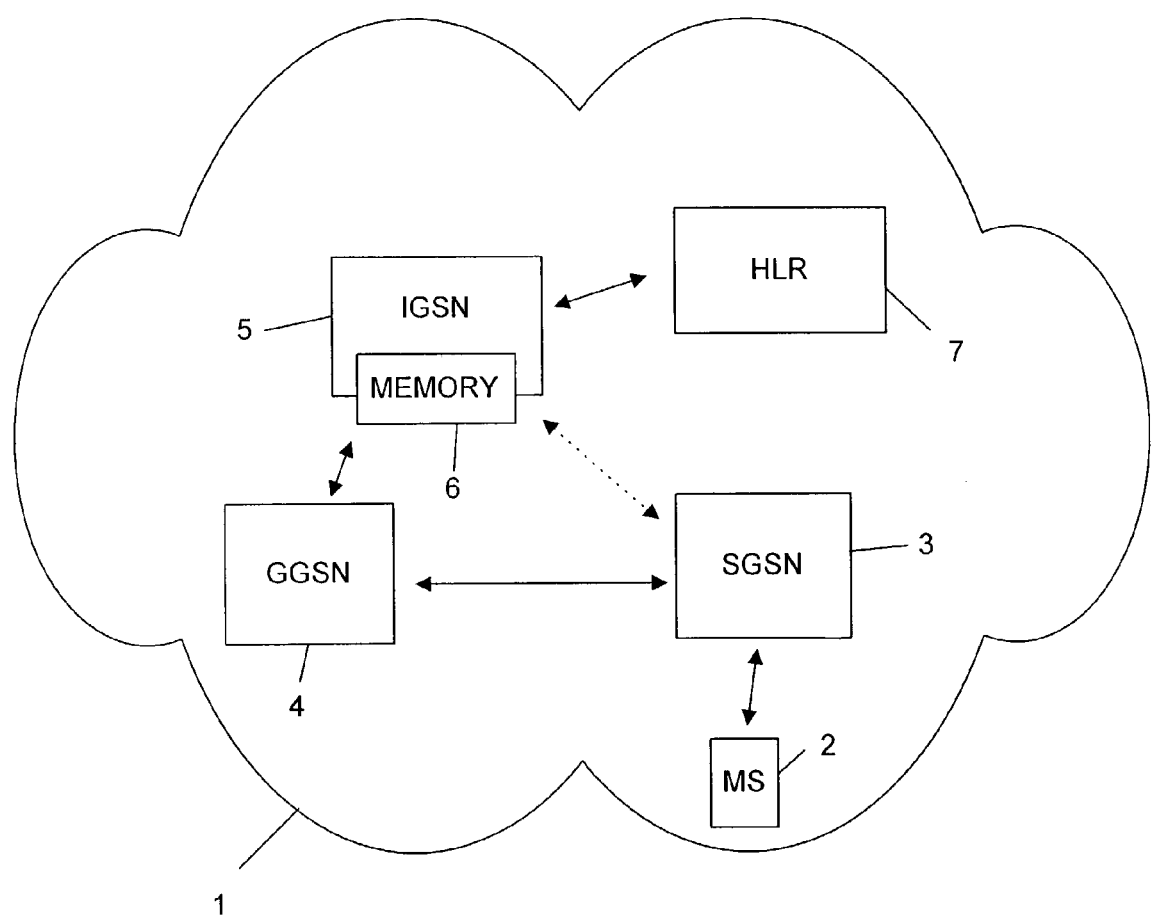
FIG. 1 shows a schematic representation of one embodiment of the present invention.

FIG. 1 shows an embodiment of a telecommunication system which comprises a network 1. The network 1 preferably is a packet-switched network such as a GPRS (General Packet Radio Service) or an UMTS (Universal Mobile Telecommunications System) network. The network 1 comprises a plurality of user equipments such as mobile stations (MS) 2 which are able to communicate with other user equipments or terminals arranged in the same or another network. For placing or receiving a connection, a user equipment 2 is supported by a support node 3 which here is a SGSN (Serving GPRS support node) and which communicates (exchange of user traffic data and signalling) with a further node 4 which may be a gateway node such as a GGSN (Gateway GPRS support node). In a practical implementation of the network 1, one or more support nodes 4 and/or support nodes 3 are provided.

A subscriber information register such as a home location register (HLR) 7 stores location information and other information on a plurality of user equipments 2. In the present embodiment, the support node 4 communicates with the HLR 7 via an NRCA support node 5.

Each of these support nodes 4 is sending information to the support node 5 when a Network requested context activation is required. The support node 5 is then further requesting or sending information from or to the home location register 7. Hence, the support node 5 may handle signalling from all support nodes 4. The GGSN 4 and/or the SGSN 3 may additionally communicate directly with the register 7.

For limiting the maximum storage capacity necessary in the gateway support node(s) 4, the support node 5 comprises a memory 6 which stores information such as "MNRG flag", and/or the relation between IMSI and IP address and/or "Old SGSN address", i.e. the address of the SGSN with which the GGSN established the last PDP context.

According to the invention, information related to a specific process such as a NRCA process is stored in a network element such as an NRCA support node 5 via which a HLR inquiry may be performed for this process (e.g. NRCA). Furthermore, this NRCA network element 5 shall contact the serving support node 3 with requests such as a PDU notification request message. This is normally done, in the prior art, by the gateway support node.

According to the standards, the Interworking support node 5 may perform a GTP to MAP message conversion (e.g. a conversion from a GTP send routing info message to MAP send routing info message), but do not store context related to subscriber (information may only be stored for the time of a transaction). The gateway support node has according to the standards:

store context related to subscriber (such as "MNRG flag", and/or the relation between IMSI and IP address and/or "Old SGSN address")

decide to query the HLR or not. If the MS is marked non-reachable, or if the old SGSN address is stored, the HLR may not be queried.

According to this invention, the implementation of the gateway support node is simplified with respect to handling of NRCA requests because the NRCA-related information may be stored in the NRCA support node 5. The inquiries of the HLR 7 from the gateway support node 4 are handled by the NRCA support node 5. The NRCA support node 5 decides to query the HLR or not, based on the parameter it is storing.

Therefore, some of the tasks normally performed by the gateway support node 4 are carried out by the NRCA support node 5. In this case, it is the task of the NRCA support node to check the NRCA parameters like "mobile not reachable for GPRS" flag and the "old SGSN address". If "mobile not reachable reason cause" is not set and an SGSN address is present in the NRCA node, the NRCA node sends the PDU notification request message to the stored SGSN address. The SGSN 3 sends a "request PDP context activation" message to the mobile station MS 2. The PDP context activation is performed toward the gateway support node 4 (as it is the only one handling this user IP address).

The invention can also be implemented, in an alternative embodiment, by storing the PDP address (or IP address) to IMSI mapping in an LDAP server.

The IMSI is used to find the HLR address, so the entity performing the MAP interrogation needs the means to derive the IMSI related to a request.

Although, in the above, NRCA is mainly used for explaining the problems and solution underlying the present invention, the same is not restricted to NRCA requests but is applicable to all network structures handling connections between a gateway node and one or more user equipments.

Figure 2:
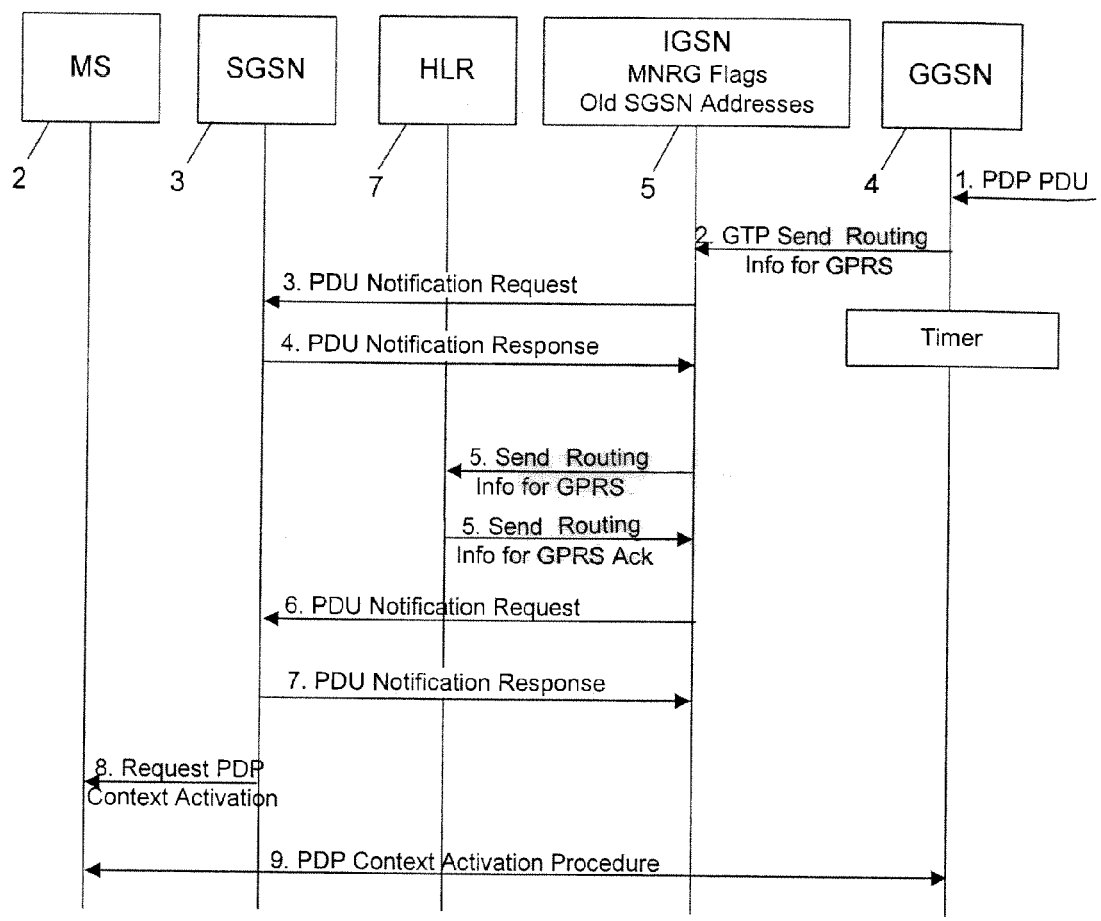
FIG. 2 illustrates steps performed in an embodiment of a method according to the invention.

FIG. 2 illustrates an embodiment of a method according to the invention.

Generally, the network-requested PDP context activation procedure is standardized and e.g. described in EN 301 344 V6.3.2 (1999-07) of ETSI (European Telecommunications Standards Institute). See page 61 ff., of section 9.2.2.2. The network-requested PDP context activation procedure allows the GGSN to initiate the activation of a PDP (Packet Data Protocol) context. When receiving a PDP PDU (Protocol Data Unit), the GGSN 4 checks if a PDP context is established for that PDP address. If no PDP context has been previously established, the GGSN 4 may try to deliver the PDP PDU by initiating the network-requested PDP context activation procedure. The criteria used by the GGSN to determine whether or not to try to deliver the PDP PDU to the MS 2 may be based on subscription information.

To support network-requested PDP context activation, the GGSN 4 has to have static PDP information about the PDP address. To determine whether network-requested PDP context activation is supported for a PDP address, the GGSN 4 checks if there is static PDP information for that PDP address. Once these checks have been performed, the GGSN 4 may initiate the network-requested PDP context activation procedure.

In the preferred embodiment of the invention, GGSN have no static information about the PDP address. It is using GGSN configuration and/or an APN configuration to determine if NRCA procedure should be attempted. APN configuration means NRCA is tried (or not) for all IP addresses belonging to APN. A GGSN configuration means NRCA is tried (or not) for all IP addresses belonging to GGSN.

The signalling and messages shown in FIG. 2 are described below in greater detail.

1) When receiving a PDP PDU, the GGSN 4 determines whether a network-requested PDP context activation procedure has to be initiated. The GGSN 4 starts a timer T (not shown) and may store subsequent PDP PDUs received for the same PDP address.

2) The GGSN 4 sends a "send routing info for GPRS" message to the NRCA support node 5 (e.g. IGSN) which message may contain the information IMSI or the IP address or the logical name. Although not shown, the NRCA support node 5 may acknowledge the request of step 2.) by sending back a message to GGSN 4. In this case timer T may be started after the acknowledge is received.

3) If the "old SGSN address" is present (if not present see step 5) in the memory 6 of NRCA support node 5, and either no "mobile station not reachable reason" information is present, or, if present, this information "mobile station not reachable reason" indicates "no paging response", the NRCA support node 5 sends a PDU notification request (indicating IMSI, PDP type, PDP address, access point name APN) message to the old SGSN address.

4) If a MM (mobility management) context of the mobile station 2 is indicating "GPRS idle" or "UMTS PS detached", the SGSN 3 returns, in step 4.), a PDU notification response (cause) message to the NRCA support node 5, with cause equal to "MS GPRS detached" The NRCA support node 5 sets the "MNRG" flag for that PDP address in its memory 6, and sends a failure report (IMSI, NRCA support node number) message to the HLR 7 to request MNRG to be set in the HLR 7, or "IMSI not known". If the SGSN 3 does not have information about that user, the SGSN 3 returns, in step 4.), a PDU notification response (cause) message to the NRCA support node 5, with cause equal to "IMSI not known". The NRCA support node 5 then queries the HLR to request the address of the SGSN handling last the MS as in step 5.

If SGSN has an active MM context, the cause indicated in the response of step 4.) represents "activation proceeds", and the SGSN 3 in this case moves to step 8.), that is sends a "request PDP context activation" message to the mobile station 2.

5) The NRCA support node 5 sends a "MAP send routing info for GPRS" message to the HLR which message contains the information IMSI. The HLR returns the SGSN address to the NRCA support node.

6) The NRCA support node 5 sends a PDU notification request (indicating IMSI, PDP type, PDP address, access point name APN) message to the SGSN address.

7) If the SGSN has an active MM context, the cause indicated in the response of step 4.) represents "activation proceeds", and the SGSN 3 in this case moves to step 8.), that is sends a "request PDP context activation" message to the mobile station 2.

If the cause is "MS GPRS detached" or "IMSI not known", and if the SGSN 3 has an MM context for that user, the SGSN 3 sets MNRG to indicate the need to report to the HLR 7 when the next context with that MS 2 is performed.

When the NRCA support node 5 receives, in step 4., a PDU notification response indicating that the request PDP context activation could not yet be sent to MS 2, the NRCA support node 5 may send a "send routing information for GPRS" message to the HLR 7 indicating the IMSI received in step 2 or derived from parameter received in step 2. This corresponds to step 5.). When the HLR 7 determines that the request can be served, it returns a "send routing information for GPRS Ack (IMSI, SGSN address, mobile station not reachable reason)" message to the NRCA support node 5. The "mobile station not reachable reason" parameter is included if the MNRG flag is set in the HLR 7. The "mobile station not reachable reason" parameter indicates the reason for the setting of the MNRG flag as stored in the MNRR (mobile station not reachable reason) record (See GSM 03.40). If the MNRR record shows reason other than "no paging response", the HLR 7 shall include the NRCA support node 5 number in the "GGSN-list" of the subscriber to which the mobile station 2 is assigned. Here, the GGSN-list in fact contains the number of NRCA support node 5 instead of same of GGSN 4.

If the HLR 7 determines that the request can not be served (e.g., IMSI is unknown in HLR), the HLR 7 sends a "send routing information for GPRS Ack (IMSI, MAP error cause)" message back to NRCA support node 5. The information "MAP error cause" indicates the reason for the negative response.

If the SGSN address is present in this response, and either "mobile station not reachable reason" is not present, or "mobile station not reachable reason" indicates "no paging response", the NRCA support node 5 sends, in step 6.), a "PDU notification request (IMSI, PDP type, PDP address, access point name APN)" message to the SGSN indicated by the HLR 7. Otherwise, the NRCA support node 5 shall set the MNRG flag for that MS 2. The SGSN 3 returns a "PDU notification response (cause)" message to the NRCA support node 5 in step 7.), in order to acknowledge that it shall request the MS 2 to activate the PDP context indicated with PDP address.

The "PDU notification request" of step 6.) may also fail for the same reason as described with regard to step 3.

In step 8.), the SGSN 3 sends a "request PDP context activation (TI, PDP type, PDP address, APN)" message to request the MS 2 to activate the indicated PDP context.

In step 9.), the PDP context is activated with the PDP context activation procedure, as defined in the standards. See for instance section "PDP context activation procedure" of EN 301 344.

In practice, the NRCA support node 5 containing the memory 6 may be an independent node, or may be integrated in a SGSN 3, an IGSN or another signalling gateway. A signalling gateway is used for SS7 to IP conversion in a network organized according to 3GPP Release 2000. Implementing this feature in a signalling gateway is therefore one of the practical solutions.

Figure 3:
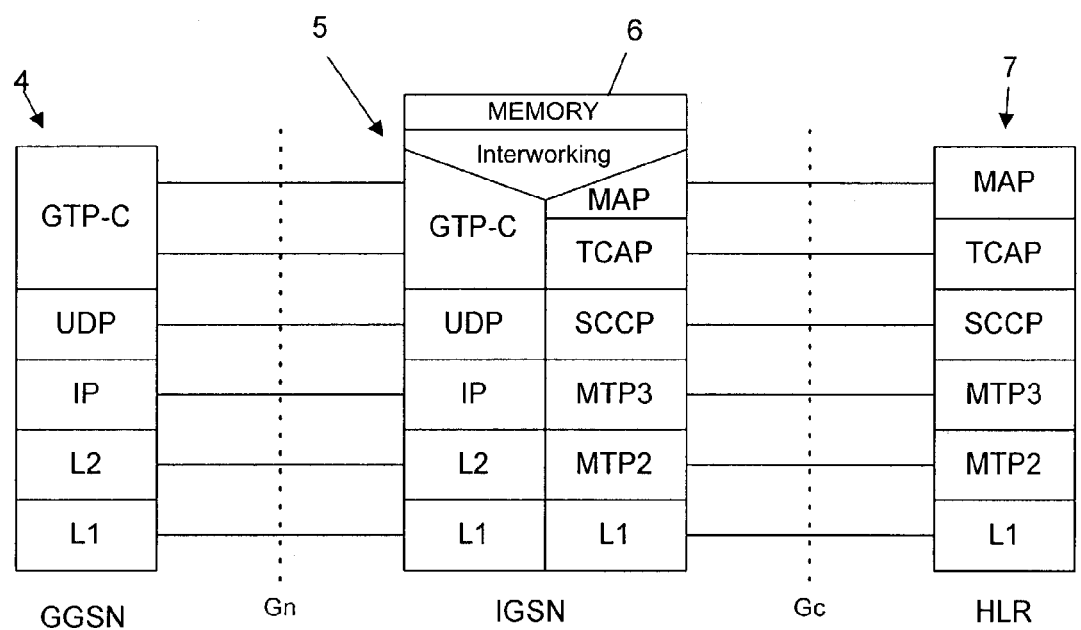
FIG. 3 illustrates a GTP and MAP-based GSN-HLR signalling between a support node IGSN and a home location register HLR.

FIG. 3 schematically illustrates the signalling between a gateway support node 4 and the HLR 7 effected via the support node 5. The signalling path shown in FIG. 3 allows the GGSN 4 or NRCA support node 5 to exchange signalling information with the HLR 7.

According to FIG. 3, the memory device 6 is implemented in the NRCA support node 5. The function and structure of the memory device 6 is identical or similar to the above-described structure and functioning of the memory device 6. When several support nodes 5 are provided in the network 1 which are able to communicate with the HLR 7, each support node 5 is equipped with a memory device 6.

As shown in FIG. 3, the support node 5 provides an interworking function which effects protocol conversion in particular in a case where no SS7 interface is installed in the gateway support node 4. In such a case, any GSN 5 having a SS7 interface installed in the same PLMN (public land mobile network) as the GGSN 4 can be used as a GTP-to-MAP protocol converter to allow signalling between the GGSN 4 and the HLR 7. FIG. 3 illustrates the GTP and MAP-based GGSN-HLR signalling, wherein the interworking function provides the interworking between the different protocol types GTP (GPRS tunneling protocol) and MAP for the signalling between GGSN 4 and HLR 7. The MAP (Mobile Application Part) protocol is used between the NRCA support node 5 and the HLR 7. The signalling plane shown in FIG. 3 is standardized and is e.g. illustrated in European Standard EN 301 344 V6.3.2 (1999-07) of ETSI (European Telecommunications Standards Institute), section 5.6.2.7.2). TCAP means Transaction Capabilities Application Part. SCCP stands for Signalling Connection Control Part. MTP2 and MTP3 are abbreviations of message transfer part layer 2 and 3, respectively. L1 stands for layer 1. Because of standardization of the signalling exchange, this section is not be described in detail.

In the embodiment shown in FIG. 3, the memory device 6 is provided in the GSN 5 so that only one memory device 6 may be installed in the network 1. Each GGSN 4 (or, if having the capability), each SGSN 3 communicates with the GSN 5 for accessing the HLR 7.

In the present example, the subscriber information register storing information on one or more subscribers necessary for handling connections directed to subscribers, is implemented as a home location register. It may also have different structure and/or information contents. The invention can be implemented with regard to all subscriber information registers which have to be accessed when receiving requests such as network-requested PDP context activation procedures.

Although the invention has been described above mainly by referring to a GPRS system, it may equally be applied to any other packet-switched network, such as UMTS, or to any GSM network, or other networks.

The invention claimed is:

1. A communication system, comprising:
    a subscriber information register configured to store subscriber information;
    at least one gateway support node configured to handle connections to or from other networks;
    at least one serving node configured to handle connections toward a user equipment, said serving node configured to store context related to at least one user equipment, and configured to store information related to a network requested packet data protocol context activation process; and
    a network requested packet data protocol context activation network element, said network element being configured to
    store information of the user equipment in a memory;
    receive a connection establishment request toward the user equipment from the at least one gateway support node;
    perform protocol conversion between the at least one gateway support node and the subscriber information register;
    determine reachability of the user equipment based on location information regarding the user equipment; and
    connect the at least one serving node with the user equipment when the user equipment is reachable.

2. The communication system according to claim 1, wherein the at least one network element is configured to access the subscriber information register when information on one or more subscribers is necessary for handling connections directed to these subscribers.

3. The communication system according to claim 1, wherein:
    the network element is an interworking support node which is one of implemented as an independent support node, or as part of a serving support node.

4. The communication system according to claim 1, wherein:
    the system comprises at least one server configured to store unique subscriber identifier information.

5. The communication system according to claim 1, wherein the at least one gateway support node and the at least one network element are configured to generate or to receive messages containing an IP address instead of an international mobile subscriber information of the one or more subscribers and the at least one network element is associated with a mapping indicating correspondence between the IP addresses and the international mobile subscriber information.

6. The communication system according to claim 1, wherein:
    the at least one gateway support node and the at least one network element generates or receives messages containing a logical name of a user instead of an international mobile subscriber information thereof and the at least one network element is associated with a mapping indicating a correspondence between the logical name and the international mobile subscriber information.

7. The communication system according to claim 1, wherein:
    the subscriber information register is a home location register.

8. A communication method, comprising:
    storing context information related to at least one user equipment in a memory;
    receiving a request from a gateway support node for connection establishment;

providing protocol conversion between the gateway support node and at least one subscriber information register storing subscriber information including location information related to one or more subscribers;

determining reachability of the user equipment based on the location information from the subscriber information register; and attempting to connect a serving node to the user equipment when the user equipment is determined to be reachable.

9. The communication method according to claim 8, further comprising accessing the subscriber information register when information on one or more subscribers is necessary for handling connections directed to these subscribers.

10. The communication method according to claim 8, wherein the method is performed by at least one network element is an interworking support node which is implemented as an independent support node, or as part of a service support node.

11. The communication method according to claim 8, further comprising generating interrogation access requests for accessing the subscriber information register.

12. The communication method according to claim 8, further comprising receiving messages containing an IP address instead of an international mobile subscriber information of the one or more subscribers, wherein the providing protocol conversion includes mapping a correspondence between the IP address and the international mobile subscriber information.

13. The communication method according to claim 8, further comprising receiving messages containing a logical name of a user instead of an international mobile subscriber information thereof, wherein the providing protocol conversion includes mapping the correspondence between the logical name and the international mobile subscriber information.

14. The communication method according to claim 8, wherein the subscriber information register is a home location register.

15. The communication method according to claim 8, wherein interrogation access requests are caused by network-requested packet data protocol context activation requests.

16. The communication method according to claim 8, wherein the subscriber identity to network address mapping is an international mobile subscriber information to packet data protocol address mapping.

17. The communication method according to claim 8, wherein the storing of the context information comprises storing information including an identifier indicating a reachability of the user equipment, a mapping table between a subscriber identity of the user equipment and a network address of the user equipment, and a logical address of a serving node associated with a previous connection of the user equipment.

18. The communication method according to claim 8, further comprising:

prior to the connecting of the serving node, determining that an identifier indicating that the user equipment is reachable has been stored in the memory, and determining that a logical address of a serving node associated with the previous connection of the user equipment is stored in the memory;

requesting, from the subscriber information register, a logical address of the serving node associated with the user equipment when the attempted connection is not successful; and receiving a logical address of the serving node associated with the user equipment, and connecting the serving node using the received logical address.

19. The communication method according to claim 8, further comprising:

generating interrogation access requests to access the subscriber information register.

20. The communication method according to claim 8, wherein a subscriber identity to network address mapping is an international mobile subscriber information to packet data protocol address mapping.

21. The communication method according to claim 8, wherein the providing of the protocol conversion between the gateway support node and the subscriber information register is performed from a general packet radio service tunneling protocol to a mobile application part protocol, and a signalling system #7 to IP.

22. A network requested packet data protocol context activation network element, the network element comprising:

a memory configured to store context information related to at least one user equipment, the network element being configured to:

store information of a user equipment in a memory;

receive a connection establishment request toward the user equipment from at least one gateway support node;

perform protocol conversion between the at least one gateway support node and a subscriber information register;

determine reachability of the user equipment based on location information regarding the user equipment; and connect the at least one serving node with the user equipment when the user equipment is reachable.

23. A network element according to claim 22, wherein the network element is configured to access the subscriber information register when information on one or more subscribers is necessary for handling connections directed to these subscribers.

24. A network element according to claim 22, wherein the network element is an interworking support node which is implemented as an independent support node, or as part of a serving support node.

25. The network element according to claim 22, wherein the memory is configured to store the context information including an identifier indicating a reachability of the user equipment, a mapping table between a subscriber identity of the user equipment and a network address of the user equipment, and a logical address of a serving node associated with a previous connection of the user equipment.

26. The network element according to claim 22, wherein prior to the connecting of the serving node, the network element is configured to determine that an identifier indicating that the user equipment is reachable has been stored in the memory, and determine that a logical address of a serving node associated with the previous connection of the user equipment is stored in the memory, the network element further comprising:

a subscriber information register configured to request a logical address of the serving node associated with the user equipment when the attempted connection is not successful, wherein the network element is configured to receive a logical address of the serving node associated with the user equipment, and connecting the serving node using the received logical address.

27. The network element according to claim 22, wherein the network element is configured to generate interrogation access requests for accessing the subscriber information register.

28. The network element according to claim 22, wherein a subscriber identity to network address mapping is an international mobile subscriber information to packet data protocol address mapping.

29. The network element according to claim 22, wherein the network element is configured to perform the protocol conversion between the at least one gateway support node and the subscriber information register from a general packet radio service tunneling protocol to a mobile application part protocol, and a signalling system #7 to IP.

30. A network requested packet data protocol context activation network element, the network element comprising:

memory means for storing context information related to at least one user equipment;

storing means for storing information of a user equipment in a memory;

receiving means for receiving a connection establishment request toward the user equipment from at least one gateway support node;

performing means for performing protocol conversion between the at least one gateway support node and a subscriber information register;

determining means for determining reachability of the user equipment based on location information regarding the user equipment; and connecting means for connecting the at least one serving node with the user equipment when the user equipment is reachable.

* * * * *